United States Patent
Nagasawa

(10) Patent No.: US 10,864,877 B2
(45) Date of Patent: Dec. 15, 2020

(54) PASSENGER PROTECTION APPARATUS

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 78 days.

(21) Appl. No.: 16/239,791

(22) Filed: Jan. 4, 2019

(65) Prior Publication Data

US 2019/0299902 A1    Oct. 3, 2019

(30) Foreign Application Priority Data

Mar. 30, 2018    (JP) .................... 2018-068545

(51) Int. Cl.
  *B60R 21/207*    (2006.01)
  *B60R 21/0132*    (2006.01)
  (Continued)

(52) U.S. Cl.
  CPC ........ *B60R 21/207* (2013.01); *B60R 21/0132* (2013.01); *B60R 21/01552* (2014.10);
  (Continued)

(58) Field of Classification Search
  CPC .............. B60R 21/207; B60R 21/0132; B60R 21/01552; B60R 21/01554;
  (Continued)

(56) References Cited

U.S. PATENT DOCUMENTS 6,345,839 B1 *  2/2002  Kuboki ................. B60N 2/002
                                            280/735
8,818,644 B1 *  8/2014  Fujii .................... B60R 21/015
                                            701/45
(Continued)

FOREIGN PATENT DOCUMENTS

JP    H10-217818 A    8/1998
JP    2002-079862 A   3/2002
(Continued)

OTHER PUBLICATIONS

Japanese Office Action dated Nov. 5, 2019 Japanese Patent Application No. 2018-068545 (2 pages in Japanese with English translation).

*Primary Examiner* — Darlene P Condra
(74) *Attorney, Agent, or Firm* — Smith, Gambrell & Russell, LLP

(57) ABSTRACT

A passenger protection apparatus includes a seat, an activation member, a first detector, a second detector, and a controller. The seat has a seat cushion on which a passenger can sit. The activation member is configured to be activated upward in the seat cushion. The first detector is configured to detect or predict a collision of a vehicle. The second detector is configured to detect a sitting state of the passenger sitting on the seat cushion. The controller is configured to control activation of the activation member. The activation member can change an activation point at which the activation member is activated upward. When the first detector detects or predicts a collision of the vehicle, the controller sets the activation point on a basis of the sitting position detected by the second detector, and activates the activation member upward in the seat cushion at the determined activation point.

10 Claims, 10 Drawing Sheets

(51) Int. Cl.
 *B60R 21/015* (2006.01)
 *B60R 21/01* (2006.01)
 *B60R 21/00* (2006.01)
(52) U.S. Cl.
 CPC ............... *B60R 21/01554* (2014.10); *B60R 2021/0034* (2013.01); *B60R 2021/0053* (2013.01); *B60R 2021/0055* (2013.01); *B60R 2021/01013* (2013.01); *B60R 2021/01211* (2013.01)
(58) Field of Classification Search
 CPC ... B60R 2021/01211; B60R 2021/0053; B60R 2021/0055; B60R 2021/01013; B60R 2021/0034; B60R 2021/0407; B60N 2/002; B60N 2/4263; B60N 2/00
 See application file for complete search history.

(56) References Cited

U.S. PATENT DOCUMENTS

| | | | | |
|---|---|---|---|---|
| 2001/0040065 | A1* | 11/2001 | Takagi | B60R 21/01516 180/274 |
| 2005/0167959 | A1* | 8/2005 | Speckhart | B60N 2/002 280/735 |
| 2006/0087164 | A1* | 4/2006 | Young | B60R 21/01516 297/217.2 |
| 2007/0135982 | A1* | 6/2007 | Breed | B60N 2/2863 701/36 |
| 2014/0265263 | A1* | 9/2014 | Shankar | B60R 21/2171 280/728.2 |
| 2014/0361520 | A1* | 12/2014 | Hirako | B60N 2/42763 280/729 |
| 2015/0066308 | A1 | 3/2015 | Nagasawa | |
| 2019/0152372 | A1* | 5/2019 | Fujii | A61H 9/0078 |
| 2019/0299897 | A1* | 10/2019 | Gramenos | B60N 2/4279 |
| 2019/0337427 | A1* | 11/2019 | Thomas | B60N 2/427 |
| 2020/0047698 | A1* | 2/2020 | Akoma | B60R 21/233 |

FOREIGN PATENT DOCUMENTS

| | | |
|---|---|---|
| JP | 2009-154746 A | 7/2009 |
| JP | 2015-044533 A | 3/2015 |

* cited by examiner

PASSENGER PROTECTION APPARATUS

The present application claims priority from Japanese Patent Application No. 2018-068545 filed on Mar. 30, 2018, the entire contents of which are hereby incorporated by reference.

BACKGROUND

1. Technical Field

The present invention relates to a passenger protection apparatus.

2. Related Art

Until now, various passenger protection apparatuses has been proposed to prevent the lower body of a passenger from moving forward, so-called "submarining." There is known a bench seat for vehicle including an airbag device housed in the lower part of the front end of the seat bottom of the bench seat in order to prevent the buttocks of a passenger from moving forward, which is disclosed, for example, in Japanese Unexamined Patent Application Publication (JP-A) No. 2002-079862.

SUMMARY OF THE INVENTION

An aspect of the present invention provides a passenger protection apparatus including: a seat with a seat cushion on which a passenger can sit; an activation member configured to be activated upward in the seat cushion; a first detector configured to detect or predict a collision of a vehicle; a second detector configured to detect a sitting state of the passenger sitting on the seat cushion; and a controller configured to control activation of the activation member. The activation member can change an activation point at which the activation member is activated upward. When the first detector detects or predicts a collision of the vehicle, the controller sets the activation point on a basis of the sitting position detected by the second detector, and activates the activation member upward in the seat cushion at the determined activation point.

DETAILED DESCRIPTION

Figure 1A:
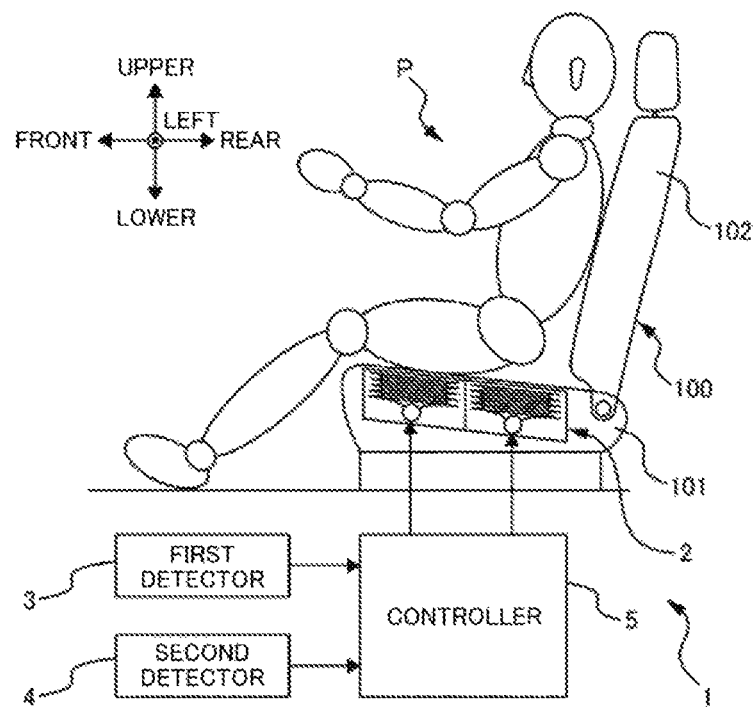
FIG. 1A is a side view schematically illustrating a passenger protection apparatus according to an example of the present invention.

Hereinafter, an example of the present invention will be described with reference to the drawings. Note that the following description is directed to an illustrative instance of the present invention and not to be construed as limiting to the present invention. Factors including, without limitation, numerical values, shapes, materials, components, positions of the components, and how the components are coupled to each other are illustrative only and not to be construed as limiting to the present invention. Further, elements in the following example which are not recited in a most-generic independent claim of the present invention are optional and may be provided on an as-needed basis. The drawings are schematic and are not intended to be drawn to scale. Throughout the present specification and the drawings, elements having substantially the same function and configuration are denoted with the same reference numerals to avoid any redundant description. The passenger protection apparatus disclosed in JP-A No. 2002-079862 can protect the passenger in an expected sitting state, but, in reality, the passenger may sit in various sitting states, not only the expected sitting state. If the passenger sits in a state different from the expected sitting state in a collision, the lower back and the buttocks of the passenger may move forward.

Figure 1B:
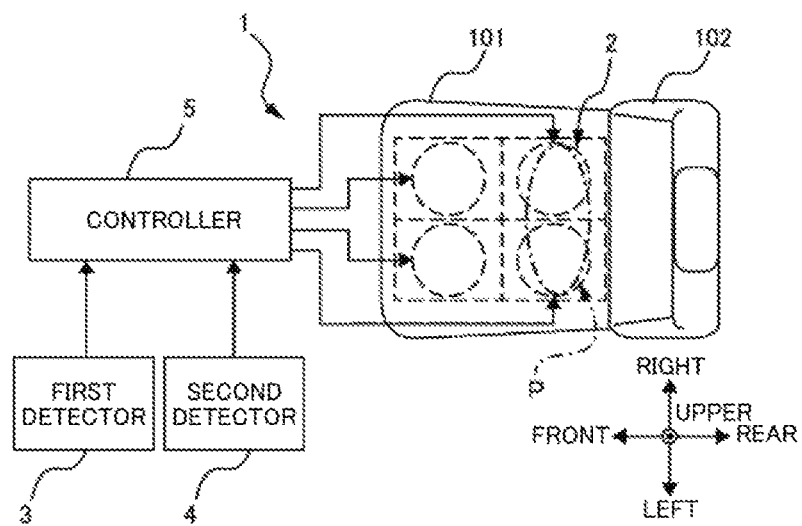
FIG. 1B is a plan view schematically illustrating the passenger protection apparatus according to an example of the present invention.
Figure 2A:
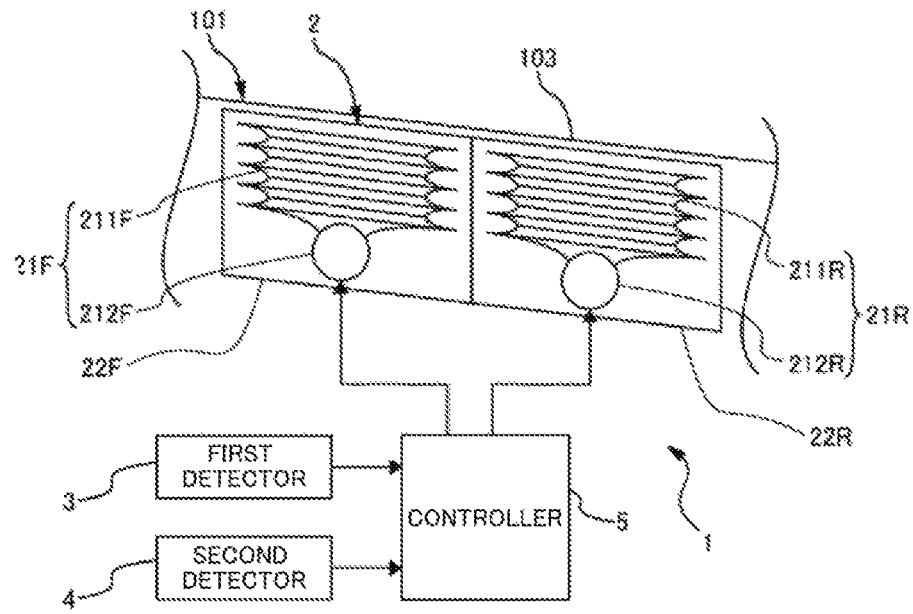
FIG. 2A is a partially enlarged view schematically illustrating protrusions of the passenger protection apparatus illustrated in FIGS. 1A-1B before a protrusion is activated.
Figure 2B:
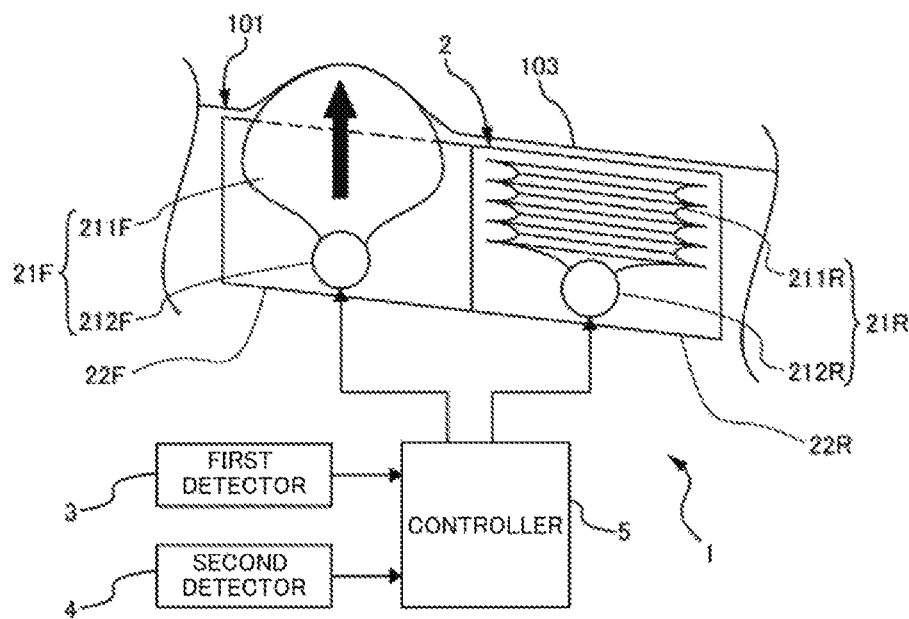
FIG. 2B is a partially enlarged view schematically illustrating the protrusions of the passenger protection apparatus illustrated in FIGS. 1A-1B after the protrusion is activated.

It is desirable to provide a passenger protection apparatus capable of preventing the lower body of the passenger from moving forward even though the passenger P sits in any postures, and therefore to prevent the passenger from being placed in a sitting state which makes it difficult to absorb the impact of a collision by an airbag and to hold the passenger by a seat belt. FIG. 1A is a side view schematically illustrating a passenger protection apparatus 1 according to an example of the present invention. FIG. 1B is a plan view schematically illustrating the passenger protection apparatus 1 according to an example of the present invention. FIG. 2A is a partially enlarged view schematically illustrating protrusions 21F and 21R of the passenger protection apparatus 1 illustrated in FIGS. 1A-1B before the protrusions 21F is activated. FIG. 2B is a partially enlarged view schematically illustrating the protrusions 21F and 21R of the passenger protection apparatus illustrated 1 in FIGS. 1A-1B after the protrusion 21F is activated.

As illustrated in FIGS. 1A-B, the passenger protection apparatus 1 includes a seat 100, an activation member 2, a first detector 3, a second detector 4, and a controller 5. The activation member 2 will be described later with reference to FIGS. 2A-2B.

The seat 100 includes a seat cushion 101 on which a passenger P can sit, and a seat back 102 on which the passenger P can lean back. As illustrated in FIG. 1B, each two activation parts are provided on the right and left sides, that is, the activation member 2 includes four activation parts.

The first detector 3 detects or predicts a collision of the vehicle. To be more specific, the first detector 3 detects or predicts a collision of the own vehicle with another vehicle or an obstacle, based on the monitoring result of the surrounding environment of the vehicle by a camera or a sensor. The first detector 3 can output the detection results to the controller 5. The first detector 3 can determine an occurrence of a collision based on the detection of an impact on the own vehicle by, for example, an in-vehicle acceleration sensor. As for the prediction of a collision, it is possible to determine whether there is a high or low possibility of a collision by: deriving a possibility that another vehicle or an obstacle approaches or contacts the own vehicle based on the result of monitoring another vehicle or the obstacle by an in-vehicle camera or a monitoring sensor and the running speed and direction of the vehicle; and determining whether the derived result exceeds a predetermined threshold. The first detector 3 may be realized by a combination of a processing unit to analyze the monitoring results and, for example, an in-vehicle camera, a monitoring sensor, or an acceleration sensor.

The second detector 4 detects the sitting state of the passenger P sitting on the seat cushion 101. To be more specific, the second detector 4 with a camera or a sensor detects at least one of the sitting position and the sitting posture of the passenger P. The second detector 4 can output the detection results to the controller 5. It is possible to correctly detect the sitting position or posture of the passenger P by using a driver monitoring system (DMS) with a camera to monitor the passenger P, a pressure sensitive sensor disposed on the surfaces of the seat cushion 101 and the seat back 102 to derive the weight distribution, and an angle sensor to detect the reclining angle of the seat back 102.

The second detector 4 can detect, for example, the maximally weighted position of the seat cushion 101. In the usual sitting position, mostly the lower back (lumbar) or the buttocks of the passenger P contacts the seat cushion 101. In FIG. 1B, a region in which the buttocks of the passenger P contacts the seat cushion 101 is indicated by an alternate long and short dash line as the sitting position of the passenger P. The sitting position of the passenger P illustrated in FIGS. 1A-1B is an appropriate sitting position ("proper sitting position") which is expected to protect the passenger P by in-vehicle passenger protection devices, such as a front airbag, side airbags, a curtain airbag, and a seat belt. Examples of sitting position other than the proper sitting position may include the front part, the right side, and the left side of the seat cushion 101 to which the weight is more applied.

The second detector 4 can detect, for example, the angle and the position of each of the parts of the passenger P's body. To be more specific, the second detector 4 can detect the relative angle and the relative position of the head, the shoulder, the neck, the waist, the lower back, the buttocks, the thigh, the knee or the shin of the passenger P. FIG. 1A illustrates the sitting posture of the passenger P during normal manual driving. Here, the passenger P sits straight. As another sitting posture, the upper body of the passenger P on the seat back 102 may be inclined backward.

The controller 5 controls the activation of the activation member 2. To be more specific, the controller 5 determines the activation point of the activation member 2, based on the detection results outputted from the first detector 3 and the second detector 4, and activates the activation member 2 at the determined activation point. The controller 5 can output activating signals to the activation member 2. As the controller 5, for example, an ECU which is an in-vehicle processing unit may be used.

Next, the activation member 2 will be described with reference to FIGS. 2A-2B. As illustrated in FIGS. 1A-1B, the passenger protection apparatus 1 according to the present example includes the activation member 2 including the activation parts arranged in right and left two rows. The activation member 2 can be activated upward in the seat cushion 101, and change the activation position at which the activation member 2 is activated upward. With the present example, a front protrusion 21F is activated when the activation member 2 needs to be activated in the front part of the activation member 2, and a rear protrusion 21R is activated when the activation point is changed to the rear part. The activation parts of the activation member 2 are the same except the locations, and therefore the front protrusion 21F will be described as an example.

The front protrusion 21F is stored in a storage member 22F provided in the front part of the activation member 2. The front protrusion 21F includes an airbag body 211F having a pouch-like shape and an inflator 212F. As the airbag body 211F and the inflator 212F, any members used in an existing airbag for vehicle may be applicable. The inflator 212F is fixed in the storage member 22F. The storage member 22F is a housing configured to accommodate the front protrusion 21F, and fixed in the seat cushion 101. With the present example, the storage member 22F is open upward, and therefore does not prevent the expansion of the airbag body 211F described later.

As illustrated in FIG. 2B, the front protrusion 21F is activated. The front protrusion 21F of the activation member 2 is activated upward to push a seat surface 103 up, so that the seat surface 103 is deformed and protruded upward. In order to activate the front protrusion 21F, first an activating signal is inputted from the controller 5 to the inflator 212F, so that explosives in the inflator 212F are ignited. By this means, gas is generated in the inflator 212F and injected into the airbag body 211F, so that the airbag body 211F can expand. That is, the activation of the activation member 2 illustrated in FIGS. 2A-2B means that the airbag body 211F deploys upward.

With the present example illustrated in FIG. 2B, the controller 5 determines that the activation point of the activation member 2 is located in the front part of the activation member 2. Meanwhile, when the controller 5 determines that the activation point of the activation member 2 is located in the rear part of the activation member 2, the rear protrusion 21R is activated. By changing the activation point of the activation member 2, the position of the seat surface 103 at which the seat surface 103 is deformed and protruded by the protrusions 21F and 21R is changed.

Figure 3A:
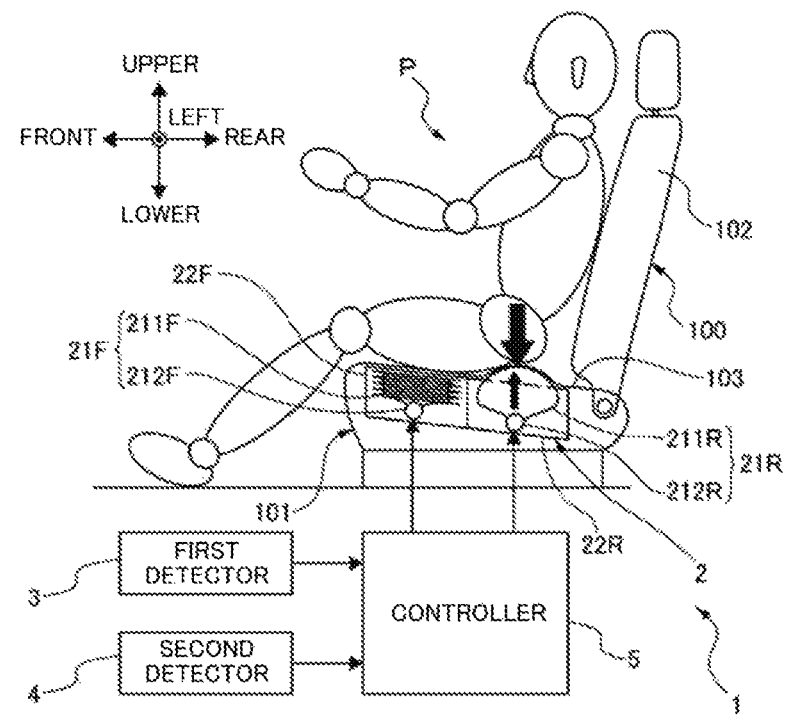
FIG. 3A is a side view schematically illustrating the activation of an activation member of the passenger protection apparatus illustrated in FIGS. 1A-1B.
Figure 3B:
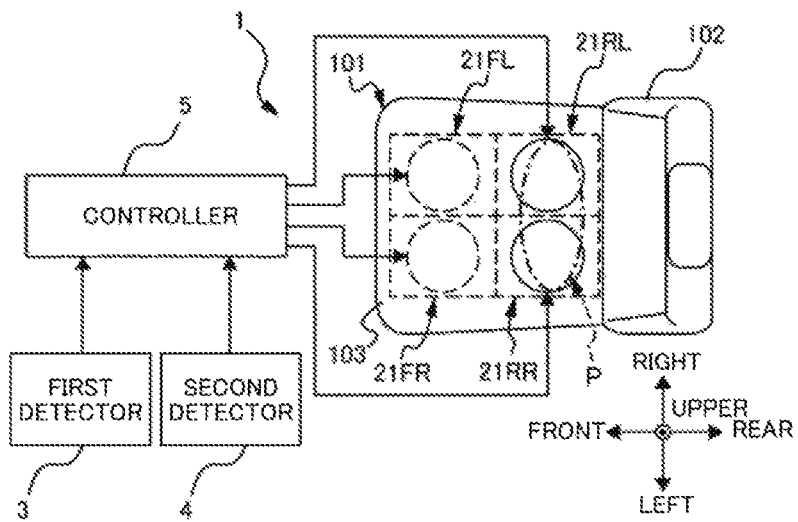
FIG. 3B is a plan view schematically illustrating the activation of an activation member of the passenger protection apparatus illustrated in FIGS. 1A-1B.
Figure 4:
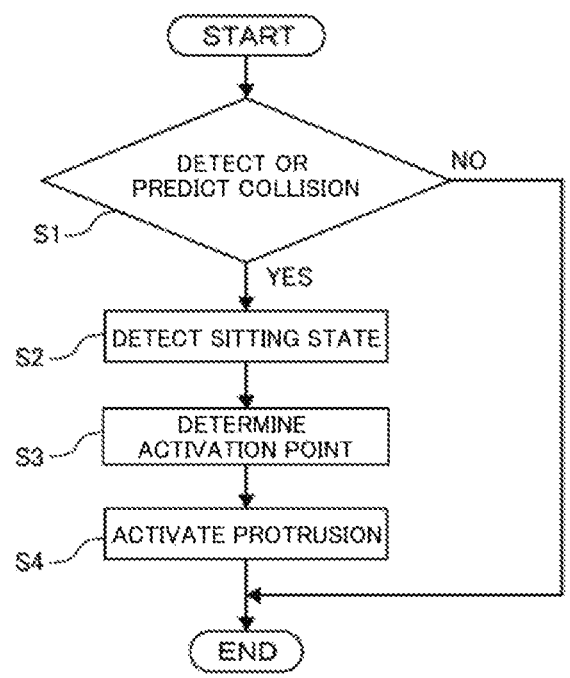
FIG. 4 is a flowchart illustrating a control process of regulating the sitting state of a passenger by using the passenger protection apparatus illustrated in FIGS. 1A-1B.

Next, an example of activation of the activation member 2 and a control process to regulate the sitting state of the passenger P by using the passenger protection apparatus 1 illustrated in FIGS. 1A-1B will be described with reference to FIGS. 3A-3B, and FIG. 4. FIG. 3A is a side view schematically illustrating the activation of an activation member 2 of the passenger protection apparatus 1 illustrated in FIGS. 1A-1B. FIG. 3B is a plan view schematically illustrating the activation of an activation member 2 of the passenger protection apparatus 1 illustrated in FIGS. 1A-1B. FIG. 4 is a flowchart illustrating a control process of regulating the sitting state of the passenger P by using the passenger protection apparatus 1 illustrated in FIGS. 1A-1B.

In the sitting state of the passenger P illustrated in FIGS. 1A-1B, the weight is maximally applied to a region of the seat surface 103 indicated by an alternate long and short dash line illustrated in FIG. 3B which corresponds to the lower back or the buttocks of the passenger P indicated by a bold black arrow illustrated in FIG. 3A. With the present example, it is preferred that the activation point of the activation member 2 is located under the lower back or the buttocks of the passenger P detected by the second detector 4. In this case, the controller 5 determines that the activation point of the activation member 2 corresponds to the position of the protrusion located under the lower back or the buttocks of the passenger P. By this means, it is possible to appropriately regulate the sitting state of the passenger P.

With the present example illustrated in FIGS. 3A-3B, the activation point of the activation member 2 corresponds to the position of the rear protrusion 21R located under the lower back or the buttocks of the passenger P. As illustrated in FIG. 3A, the airbag body 211R of the rear protrusion 21R deforms the seat surface 103 to protrude upward. In addition, as illustrated in FIG. 3B, the activation member 2 includes a pair of right front protrusion 21FR and left front protrusion 21FL and a pair of right rear protrusion 21RR and left rear protrusion 21RL, which are provided on the right and left sides with respect to the approximate center of the seat cushion 101 in the width direction of the seat cushion 101 (hereinafter "seat width direction"). At this time, the right rear protrusion 21RR and the left rear protrusion 21RL are activated.

For the passenger protection apparatus 1 according to the present example, when a plurality of protrusions are provided in the seat width direction and in the front-rear direction of the vehicle, it is preferred that the seat surface 103 is deformed and protruded by the protrusions at the positions lined up along the seat width direction. By this means, it is possible to evenly support and hold the lower back or the buttocks of the passenger P by the protrusions in the seat width direction. The lower back or the buttocks of the passenger P is evenly supported and held in the seat width direction, and therefore, for example, it is possible to make the upper body of the passenger P face the front or the rear of the vehicle. By this means, it is possible to protect the passenger P by, for example, various types of airbags, as expected.

Next, a control process performed in the passenger protection apparatus 1 will be described with reference to FIG. 4.

First, the first detector 3 detects or predicts a collision of the own vehicle (step S1). In the step S1, when the first detector 3 determines that a collision occurs based on the detection result, the step moves to the next step (step S1/YES). In addition, in the step S1, upon detecting another vehicle or an obstacle approaching the own vehicle, the first detector 3 derives a risk due to the approach, and predicts a collision when the risk value exceeds a predetermined threshold. In this case, the step moves to the next step (step S1/YES). Here, when the first detector 3 does not detect a collision, there is no need to prepare a collision and activate the activation member 2, and therefore the process is ended (step S1/NO). In addition, when the first detector 3 does not predict a collision because there is no vehicle or obstacle approaching the own vehicle, or when there is a low possibility of a collision because the risk value does not exceed the predetermined threshold although another vehicle or an obstacle approaches the own vehicle, the process is also ended (step S1/NO). The detection result of the first detector 3 is outputted to the controller 5.

When the first detector 3 detects or predicts a collision (step S1/YES), the second detector 4 detects the sitting state of the passenger P (step S2). In the step S2, the second detector 4 detects the sitting position or posture of the passenger P. In the step 2, the second detector 4 detects the sitting state of the passenger P where the passenger P sits approximately straight, and the lower back or the buttocks of the passenger P is located in the position indicated by the bold black arrow illustrated in FIG. 3A. With the present example, the second detector 4 continuously detects the sitting state of the passenger P, and sequentially outputs the detection results to the controller 5. Here, the second detector 4 may not continuously detect the sitting state of the passenger P and sequentially output the detection results, but detect the sitting state of the passenger P as needed. That is, the controller 5 outputs an activating signal to the second detector 4 in response to the input from the first detector 3. By this means, the second detector 4 may detect the sitting state, such as the sitting position or posture of the passenger P, and output the detection result to the controller 5.

Next, the controller 5 determines activation point of the activation member 2 (step S3). In the step S3, the sitting state of the passenger P has been known by the detection result of the second detector 4, and therefore the controller 5 determines which of the front protrusion 21F and the rear protrusion 21R of the activation member 2 is activated. With the present example, based on the sitting state of the passenger P illustrated in FIGS. 3A-3B, the controller 5 determines that the activation point of the activation member 2 corresponds to the position of the rear protrusion 21R located under the lower back or the buttocks of the passenger P, to be more specific, the positions of the right rear protrusion 21RR and the left rear protrusion 21RL. After determining the activation point of the activation member 2, the controller 5 outputs an activating signal to the activation member 2.

Next, the controller 5 controls the activation of the activation member 2 (step S4). In the step S4, when the activating signal is inputted from the controller 5, the right rear protrusion 21RR and the left rear protrusion 21RL of the activation member 2 are activated at the activation point of the activation member 2 determined in the step S3.

As illustrated in FIGS. 1A-1B, and 3A-3B, the plurality of protrusions are arranged in the seat cushion 101 in the seat width direction and in the front-rear direction of the vehicle, and airbag devices as the protrusions 21L and 21R which can protrude upward are provided under the seat surface 103. The controller 5 determines the activation point of the activation member 2, thereby to determine the position of the seat surface 103 at which the seat surface 103 is deformed and protruded. Accordingly, the controller 5 controls the activation member 2 to deploy the airbag body 211R corresponding to the determined position at which the seat surface 103 is deformed and protruded. When the driving signal is inputted to the inflator 212R, gas is generated in the inflator 212R and injected into the airbag body 211R, and then the airbag body 211R deploys upward. The rear protrusion 21R protruding upward in the seat cushion 101 pushes the seat surface 103 upward. As a result, the rear part of the seat surface 103 corresponding to the rear protrusion 21R is protruded upward.

When the seat surface 103 protrudes upward under the lower back or the buttocks of the passenger P, the lower back or the buttocks of the passenger P is supported from below by the protruding seat surface 103 and rear protrusion 21R. By this means, it is possible to regulate the sitting state of the passenger P to prevent a change in the sitting state from the state illustrated in FIG. 3A. As a result, it is possible to prevent the lower body of the passenger P from moving forward, so-called "submarining", in a collision.

Thus, the activation member 2 is activated upward in the seat cushion 101 at the activation point based on the sitting state of the passenger P when a collision is detected or predicted, and therefore it is possible to restrict the movement of the lower back or the buttocks of the passenger P. In other words, the lower back or the buttocks of the passenger P being compelled to move forward is held from front by the rear protrusion 21R of the activation member 2. By this means, it is possible to place the passenger P in an appropriate sitting state which allows the protection devices in the vehicle such as the airbags and the seat belt to absorb the impact and to hold the passenger P, respectively.

Figure 5A:
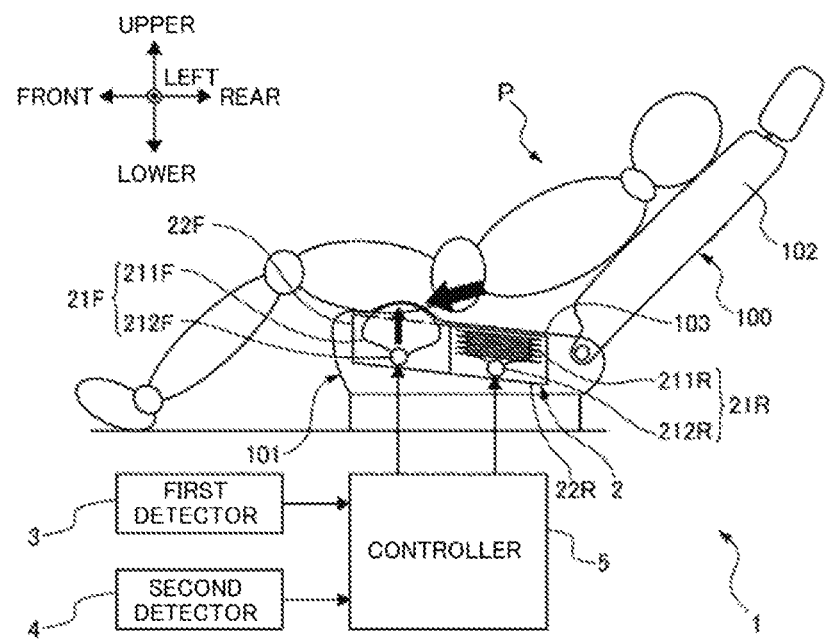
FIG. 5A is a side view schematically illustrating the passenger protection apparatus when the activation member is activated.
Figure 5B:
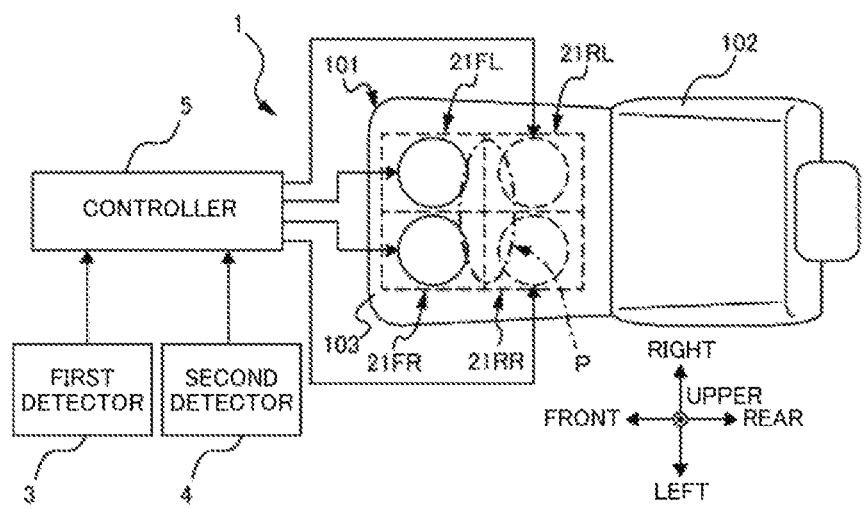
FIG. 5B is a plan view schematically illustrating the activated passenger protection apparatus when the activation member is activated.
Figure 6A:
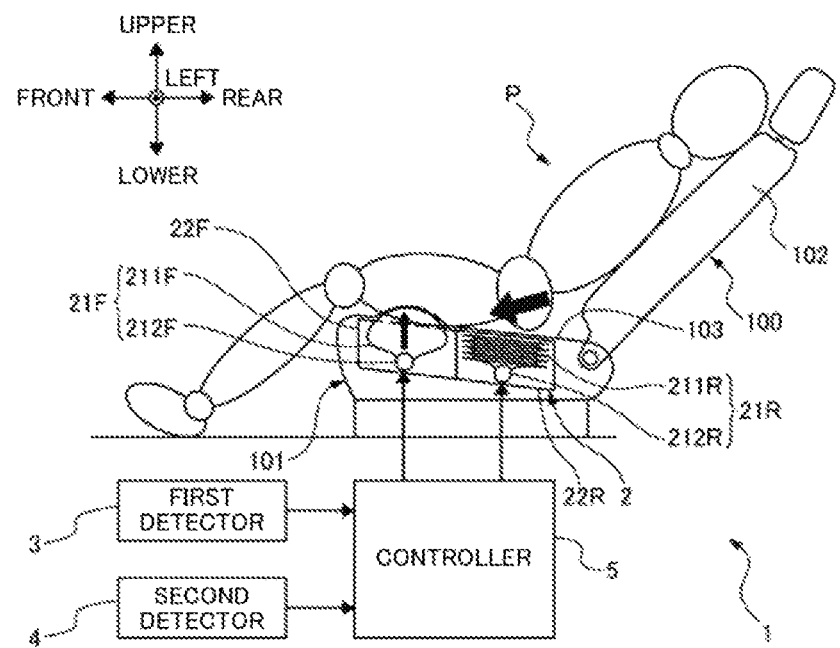
FIG. 6A is a side view schematically illustrating the passenger protection apparatus when the activation member is activated.
Figure 6B:
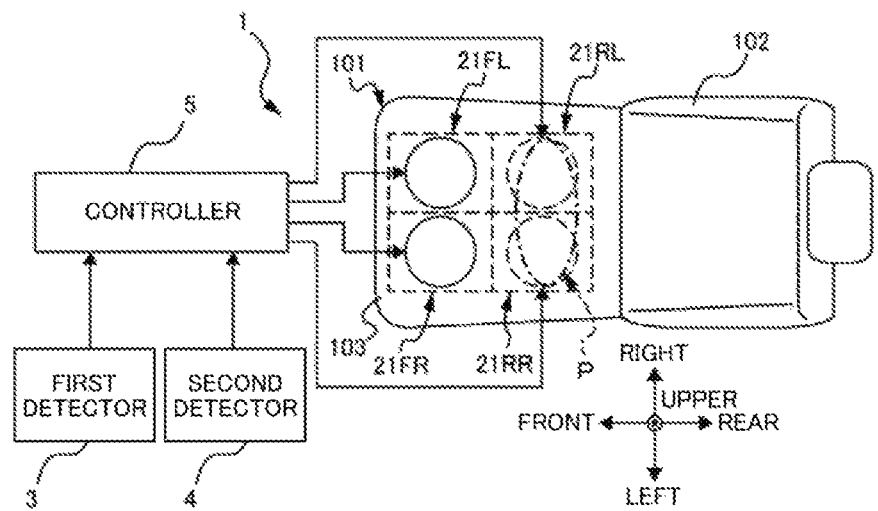
FIG. 6B is a plan view schematically illustrating the activated passenger protection apparatus when the activation member is activated.

Next, other examples of activation of the activation member 2 will be described with reference to FIGS. 5A, 5B, 6A and 6B. Here, FIG. 5A is a side view schematically illustrating the activation of the activation member 2 which is different from that of the passenger protection apparatus 1 illustrated in FIGS. 3A-3B. FIG. 5B is a plan view schematically illustrating the activation of the activation member 2 which is different from that of the passenger protection apparatus 1 illustrated in FIGS. 3A-3B. FIG. 6A is a side view schematically illustrating the activation of the activation member 2 which is different from that of the passenger protection apparatus 1 illustrated in FIGS. 3A-3B. FIG. 6B is a plan view schematically illustrating the activation of the activation member 2 which is different from that of the passenger protection apparatus 1 illustrated in FIGS. 3A-3B.

In FIG. 5A, the seat back 102 is inclined backward, and accordingly the upper body of the passenger P is inclined backward. The passenger P sits on the seat cushion 101 at a position more forward than the position illustrated in FIGS. 1A and 3A. To be more specific, the lower back or the buttocks is located in the front part of the seat cushion 101 corresponding to the front protrusion 21F. As the sitting state of the passenger P illustrated in FIG. 5A, the second detector 4 detects that the passenger P sits on the front part of the seat cushion 101 and the upper body is inclined backward.

In this case, it is determined that the activation point of the activation member 2 corresponds to the position of the front protrusion 21F located in front of the lower back or the buttocks of the passenger P. By this means, the front protrusion 21F protrudes upward to push up the seat surface 103 in front of the lower back or the buttocks of the passenger P, and therefore it is possible to support the lower back or the buttocks of the passenger P from front by the protruding seat surface 103 and front protrusion 21F. Consequently, it is possible to regulate the sitting state of the passenger P to prevent a change in the sitting state from the state illustrated in FIG. 5A. As a result, it is possible to prevent the lower body of the passenger from moving forward in a collision.

As illustrated in FIGS. 1A-1B, and 3A-3B, in a case where the passenger P sits straight, when a frontal collision occurs, the lower back and the buttocks of the passenger P may move downward to sink in the seat cushion 101 once, and move forward. For the sitting state of the passenger P illustrated in FIG. 3A, the rear protrusion 21R of the activation member 2 is activated to support the passenger P from below so as to prevent the lower back or the buttocks from sinking. By this means, the activation member 2 can prevent the lower back or the buttocks of the passenger P from sinking and moving forward.

Meanwhile, in a case where the upper body of the passenger P is inclined backward as illustrated in FIG. 5A, when a frontal collision occurs, the passenger P may slightly sink in the seat surface 103 and slide on the seat surface 103 to substantially move forward as indicated by a bold black arrow. This is caused when an inertia force to rapidly move forward is generated in, for example, a collision, due to the backward-inclined posture of the passenger P, and the state of the seat belt holding the upper body inclined backward. Here, for the sitting state of the passenger P illustrated in FIG. 5A, the lower back or the buttocks of the passenger P sinking a little is caught and supported from front by the front protrusion 21F. Therefore, it is possible to prevent the lower back and the buttocks of the passenger P from sliding on the seat surface 103 to move forward, and consequently to regulate the sitting state of the passenger P.

In FIGS. 6A-6B, the seat back 102 is inclined backward, and accordingly the passenger P is inclined backward. Here, the passenger P sits on the rear part of the seat cushion 101, which is approximately the same as the sitting position illustrated in FIGS. 1A-1B and 3A-3B. As the sitting state of the passenger P illustrated in FIG. 6A, the second detector 4 detects that the passenger P sits back on the seat cushion 101 and the upper body is inclined backward. Here, although the sitting position of the passenger P illustrated in FIG. 6A is different from that of 5A, the posture is the same, that is, the upper body is inclined backward. Therefore, like the passenger P illustrated in FIG. 5A, the passenger P may slightly sink in the seat surface 103 and slide on the seat surface 103 to substantially move forward as indicated by a bold black arrow.

In this case, it is determined that the activation point of the activation member 2 corresponds to the position of the front protrusion 21F located in front of the lower back or the buttocks of the passenger P, in the same way as FIGS. 5A-5B. By this means, the front protrusion 21F protrudes upward to push up the seat surface 103 in front of the lower back or the buttocks of the passenger P, and therefore it is possible to support the lower back or the buttocks of the passenger P from front by the protruding seat surface 103 and front protrusion 21F. Consequently, it is possible to regulate the sitting state of the passenger P to prevent a change in the sitting state from the state illustrated in FIG. 6A. As a result, it is possible to prevent the lower body of the passenger P from sliding on the seat surface 103 to move forward in a collision.

As described above, the passenger protection apparatus 1 according to the example illustrated in FIGS. 1A to 6B can change the activation point of the activation member 2 in the front-rear direction of the vehicle. In the future, for an automated driving vehicle, it is expected that, when the automated driving of the vehicle, the passenger can sit on the seat in a relaxed state, losing the grip of the steering wheel as illustrated in FIGS. 5A and 6A. In this case, the passenger protection apparatus 1 controls the activation of the activation member 2 at the activation point based on the sitting state of the passenger P. Therefore, it is possible to prevent the lower body of the passenger P from moving forward, even though the passenger P sits in any postures. Consequently, it is possible to prevent deterioration in the passenger protection performance of the protection devices in the vehicle such as airbags and a seat belt.

Figure 7:
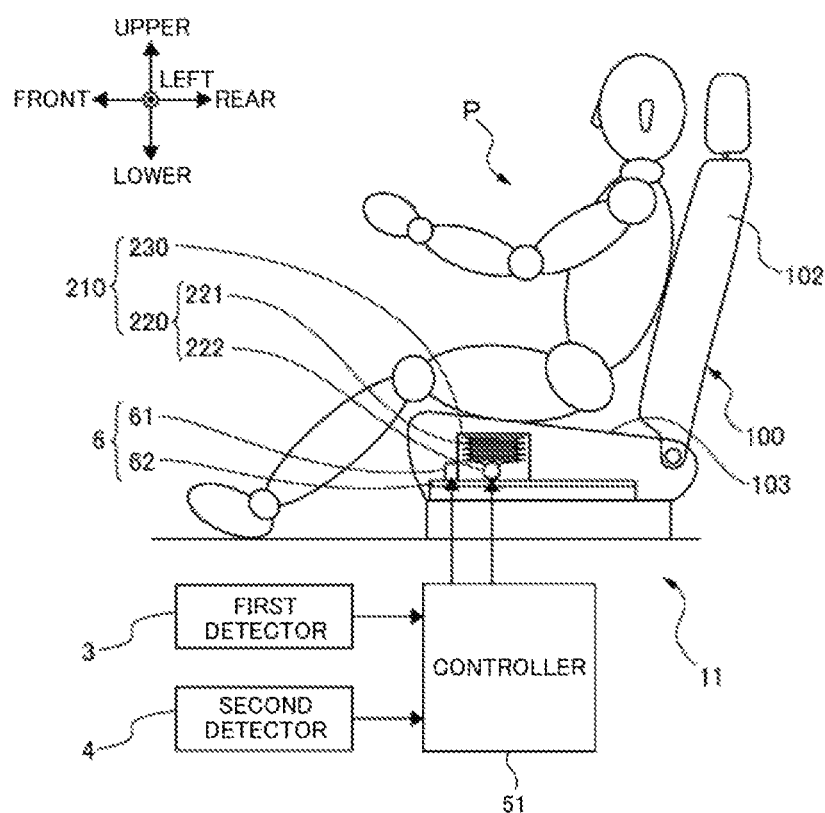
FIG. 7 is a side view schematically illustrating the passenger protection apparatus according to another example of the present invention.
Figure 8:
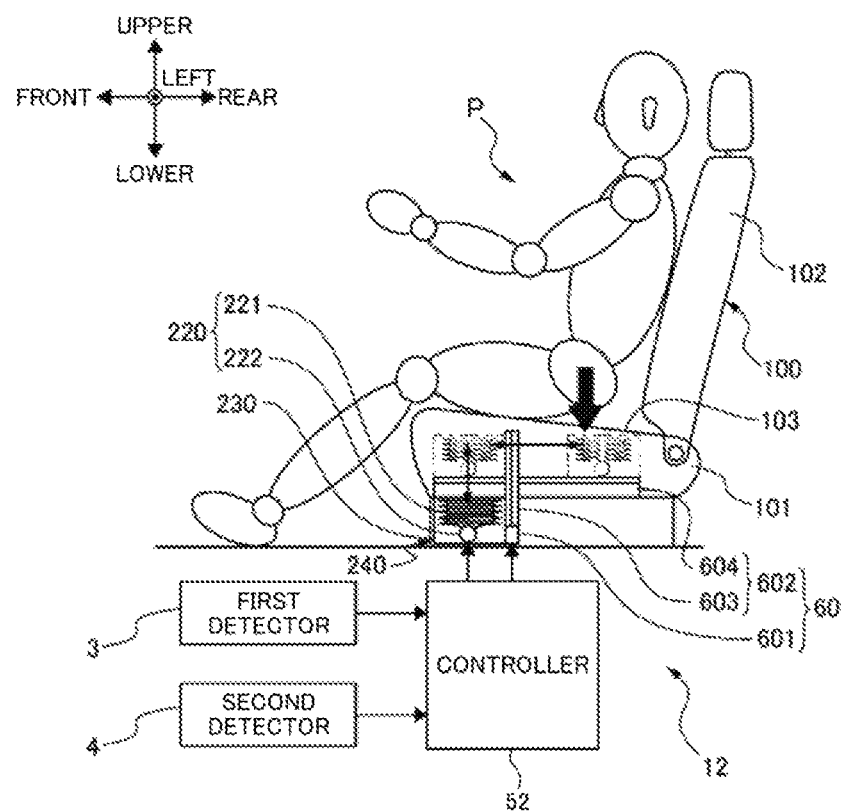
FIG. 8 is a side view schematically illustrating the passenger protection apparatus according to another example of the present invention.

Next, passenger protection apparatuses 11 and 12 according to other examples will be described with reference to FIGS. 7 and 8. FIG. 7 is a side view schematically illustrating the passenger protection apparatus 11 according to another example of the present invention. FIG. 8 is a side view schematically illustrating the passenger protection apparatus 12 according to another example of the present invention. Hereinafter, for the passenger protection apparatuses 11 and 12, the difference from the passenger protection apparatus 1 will be described. The same components are assigned with the same reference numerals, and redundant description is omitted.

The passenger protection apparatus 11 illustrated in FIG. 7 includes an activation member 210 instead of the activation member 2 of the passenger protection apparatus 1. The activation member 210 includes a protrusion 220. The protrusion 220 includes an airbag body 221 having a pouch-like shape and configured to be able to deploy upward under the seat surface 103, and an inflator 222. The airbag body 221 and the inflator 222 are accommodated in a storage member 230 configured to be movable.

The activation member 210 includes a movement member 6 configured to move the protrusion 220 in the front-rear direction of the vehicle. The movement member 6 illustrated in FIG. 7 includes an actuator 61 and a slide rail member 62. The storage member 230 accommodating the protrusion 220 can slide on the slide rail member 62 disposed under the seat surface 103 along the front-rear direction of the vehicle. The actuator 61 functions as a power source to apply power to the storage member 230 to move forward and backward on the slide rail member 62.

A controller 51 can output an activating signal to the actuator 61 of the movement member 6 and an activating signal to the protrusion 220. Here, for the passenger protection apparatus 11, the default position of the protrusion 220 is not limited, but with the present example, the default position is located at an approximately middle point between the front protrusion 21F and the rear protrusion 21R illustrated in FIGS. 3A-B.

A step of moving the protrusion 220 by the movement member 6 is inserted between the step S3 of determining the activation point and the step S4 of activating the protrusion illustrated in FIG. 4, so that it is possible to move the protrusion 220 to the determined activation point. To be more specific, the controller 51 outputs an activating signal to the actuator 61 to move the protrusion 220 from the default position to the activation point. Next, the controller 51 outputs an activating signal to the protrusion 220 located at the activation point to deploy the airbag body 221 upward.

By this means, it is possible to deform and protrude the seat surface 103 upward by the protrusion 220 at the activation point suitable for the sitting state, that is, the sitting position or posture of the passenger P, in the same way as the configurations illustrated in FIGS. 3A-3B, 5A-5B and 6A-6B. Here, with the example illustrated in FIG. 7, when the activation point of the activation member 210 is changed in the front-rear direction of the vehicle based on the sitting state of the passenger P, the single protrusion 220 is moved to an appropriate position. Therefore, it is possible to reduce the number of components and the weight of the vehicle, compared to the example illustrated in FIGS. 1A-1B to 6A-6B.

Next, in FIG. 8, the passenger protection apparatus 12 includes an activation member 240, instead of the activation member 2 of the passenger protection apparatus 1. The activation member 240 includes the protrusion 220 and a movement member 60. The activation member 240 is different from the activation member 210 illustrated in FIG. 7 in the default position of the protrusion 220 and the movement path of the protrusion 220 moved by the movement member 60.

The protrusion 220 is disposed in the front lower part of the seat cushion 101 as the default position. A slide rail 602 of the movement member 60 includes a vertical extension 603 extending in the vertical direction of the vehicle, and a front-rear extension 604 extending in the front-rear direction of the vehicle. As illustrated in FIG. 8, when the protrusion 220 is located at the default position, the vertical extension 603 is located near the seat surface 103, and the front-rear extension 604 is provided on the upper end of the vertical extension 603.

A controller 52 can output an activating signal to the actuator 601 of the movement member 60 and an activating signal to the protrusion 220.

A step of moving the protrusion 220 by the movement member 60 is inserted between the step S3 of determining the activation point and the step S4 of activating the protrusion illustrated in FIG. 4, in the same way as the example illustrated in FIG. 7. By this means, it is possible to move the protrusion 220 to the determined activation point. To be more specific, the controller 52 outputs an activating signal to the actuator 601 to first move the protrusion 220 from the default position located under the front part of the seat cushion 101 to the activation point. In this case, the protrusion 220 moves upward to a position near the seat surface 103 along the vertical extension 603, and then moves backward to the determined activation point along the front-rear extension 604. Next, the controller 52 outputs an activating signal to the protrusion 220 located at the activation point, so that the airbag body 221 deploys upward.

By this means, it is possible to deform and protrude the seat surface 103 upward by the protrusion 220 at the activation point suitable for the sitting state, that is, the sitting position or posture of the passenger P, in the same way as the configurations illustrated in FIGS. 3A-3B, 5A-5B and 6A-6B. Here, with the example illustrated in FIG. 8, when the activation point of the activation member 240 is changed in the front-rear direction of the vehicle based on the sitting state of the passenger P, the single protrusion 220 is moved to an appropriate position. Therefore, it is possible to reduce the number of components and the weight of the vehicle, compared to the example illustrated in FIGS. 1A-1B to 6A-6B. In addition, the default position of the protrusion 220 is set under the seat cushion 101. Therefore, it is possible to prevent the activation member 240 from touching the buttocks or the thighs of the passenger P sitting on the seat cushion 101 via the seat surface 103, and consequently to prevent the passenger P sitting on the seat cushion 101 from feeling a foreign body. Moreover, in order to move the protrusion 220 to the activation point, the protrusion 220 first moves to a position near the seat surface 103 along the vertical extension 603. By this means, it is possible to prepare to deploy the airbag body 221 of the protrusion 220 to regulate the sitting state of the passenger P. If a period of time until a collision occurs, which is derived by the first detector 3, is drastically shortened due to a change in the surrounding environment, it is possible to promptly protrude the protrusion 220 to immediately deform and protrude the seat surface 103. That is, with the example illustrated in FIG.

8, the passenger protection apparatus 1 can support an unexpected change in the surrounding environment.

Here, with the present example, although the movement member 60 moves the protrusion 220 upward from the default position once, this motion may be incorporated in the upward motion of the activation member 240. That is, with the example illustrated in FIG. 8, the protrusion 220 is first moved upward by the movement member 60, and then the airbag body 221 of the protrusion 220 deploys upward. In other words, the upward motion is performed in two steps.

Figure 9:
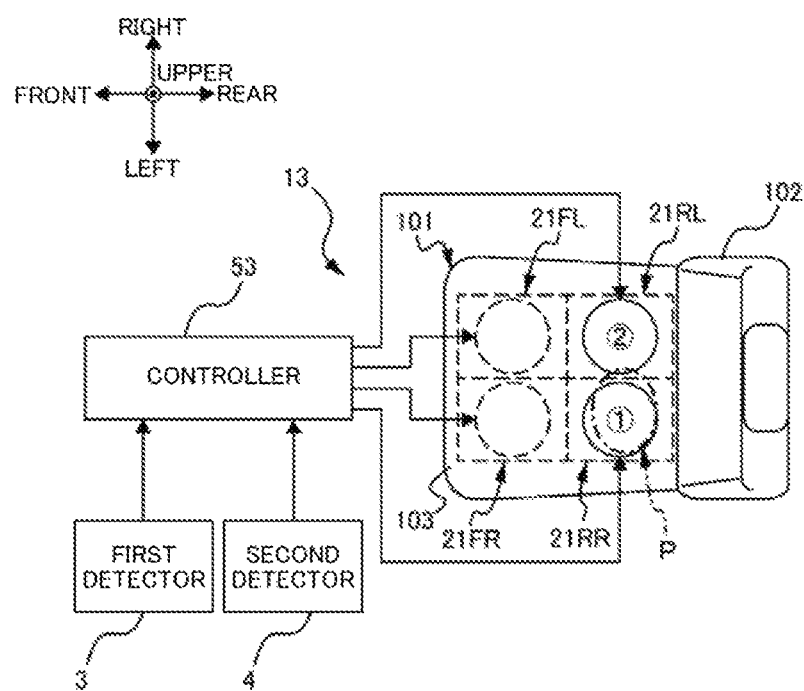
FIG. 9 is a plan view schematically illustrating the passenger protection apparatus according to another example of the present invention.

Next, a passenger protection apparatus 13 according to an example, which is different from that illustrated in FIGS. 3A-3B, 5A-5B, and 6A-6B, will be described with reference to FIGS. 9 and 10. FIG. 9 is a plan view schematically illustrating the activation of the activation member 2 which is different from that of the passenger protection apparatus 1 illustrated in FIGS. 3A-3B.

Figure 10:
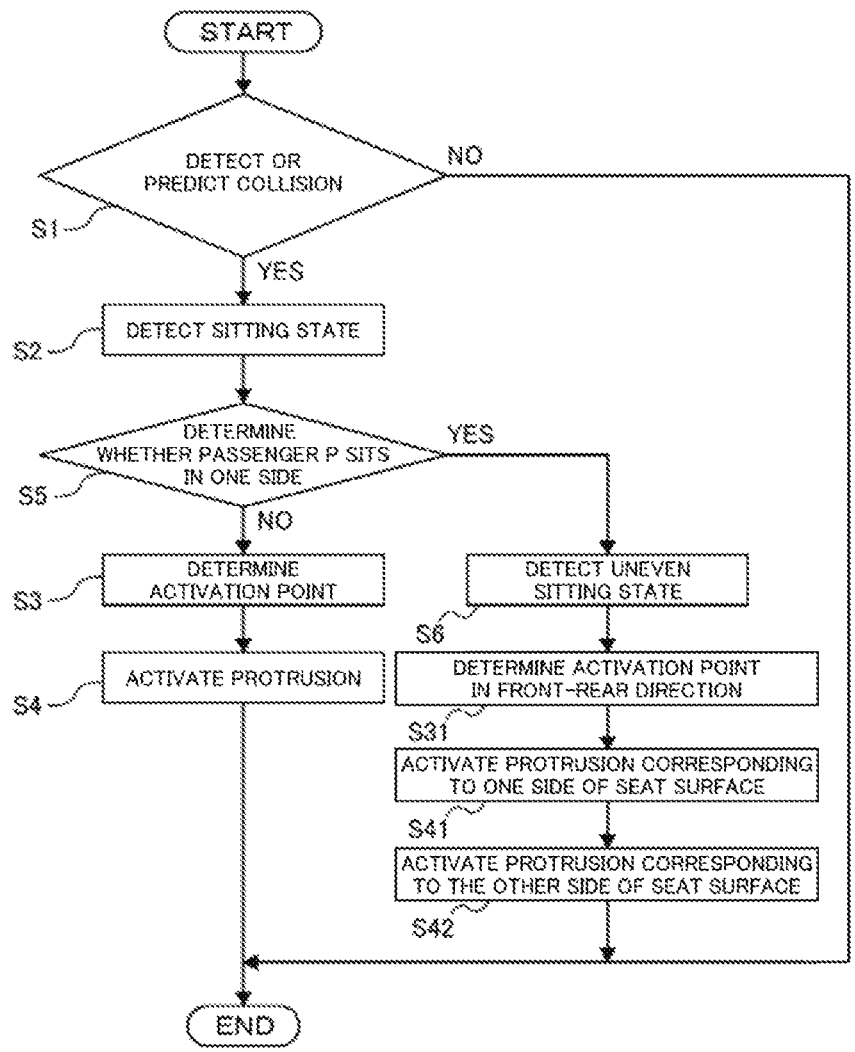
FIG. 10 is a flowchart illustrating a control process of regulating the sitting state of a passenger by using the passenger protection apparatus illustrated in FIG. 9.

FIG. 10 is a flowchart illustrating a control process of regulating the sitting state of the passenger P using the passenger protection apparatus 13 illustrated in FIG. 9.

The passenger protection apparatus 13 illustrated in FIG. 9 includes the components which are the same as those of the passenger protection apparatus 1 illustrated in FIGS. 1A-1B except a controller 53. Here, the control process performed by the controller 53 is different from that of the controller 5, and therefore will be described later with reference to FIG. 10.

The passenger protection apparatus 13 is intended to be used, for example, when the passenger P sits in one side of the seat cushion 101 in the seat width direction. For example, the weight of the passenger P may be maximally applied to the left portion of the seat cushion 101, which is different from the sitting state illustrated in FIGS. 3A-3B. This is caused when the passenger P sits cross-legged, or the upper body of the passenger P leans on an armrest.

In the control process performed by the passenger protection apparatus 13 illustrated in FIG. 10, the step S1 of detecting or predicting a collision by the first detector 3 and the step S2 of detecting the sitting state of the passenger P by the second detector 4 are performed in the same way as the control process illustrated in FIG. 4.

After the step S2 of detecting the sitting state of the passenger, the second detector 4 determines whether the passenger P sits in one side of the seat cushion 101 in the seat width direction (step S5). In the step S5, the second detector 4 determines whether the weight of the passenger P is evenly applied to the seat cushion 101 with respect to the approximate center of the seat width direction, based on, for example, the distribution of the pressure applied to the seat surface 103, and the sitting position or posture of the passenger P monitored by a monitoring camera in the vehicle.

When the second detector 4 determines that the passenger P does not sit in one side of the seat cushion 101 in the seat width direction (step S5/NO), the step S3 of determining the activation point of the activation member 2 and the step S4 of activating the rear protrusion 21R are performed in the same way as the control process illustrated in FIG. 4, and the process is ended. Here, in the step S4, the left rear protrusion 21RL and the right rear protrusion 21RR are protruded at the same time.

On the other hand, when the second detector 4 determines that the passenger P sits in one side of the seat cushion 101 in the seat width direction (step S5/YES), the second detector 4 detects the degree of unevenness of the sitting state (step S6). Here, as an uneven sitting state, the second detector 4 may detect a state where the passenger 101 sits on the seat cushion 101 in the right side or the left side with respect to the approximate center of the seat cushion 101 in the seat width direction, at a certain degree of unevenness. The detection result of the uneven sitting state obtained in the step S6 may be used as a parameter to determine the activation point of the activation member 2 and the order of activating of the protrusions. The second detector 4 detects that the sitting position of the passenger P in the front-rear direction of the vehicle illustrated in FIG. 9 is approximately the same as that illustrated in FIGS. 1A-1B and 3A-3B, but the passenger P sits in the left side of the seat cushion 101 in the seat width direction with respect to the approximate center of the seat cushion 101. The detection result of the uneven sitting state is outputted from the second detector 4 to the controller 53.

Next, the controller 53 determines the activation point of the activation member 2 in the front-rear direction, based on the sitting state of the passenger P detected by the second detector 4 in the step S2 (step S31). In the step S31, the controller 53 determines the activation point of the activation member 2 in the front-rear direction. As described above, the sitting position of the passenger P in the fort-rear direction illustrated in FIG. 9 is approximately the same as that illustrated in FIGS. 1A-1B and 3A-3B. Therefore, the controller 53 determines that the activation point of the activation member 2 in the front-rear direction corresponds to the rear protrusion 21R.

Next, the seat surface 103 is deformed from one side to the other side in the seat width direction at the determined activation point in the front-rear direction. To be more specific, the left rear protrusion 21RL corresponding to one side of the seat surface 103 to which the weight is applied is activated (step S41), and then the right rear protrusion 21RR corresponding to the other side of the seat surface 103 is activated (step S42). Here, the protrusions 21RR and 21RL are numbered 1 and 2 in the order of activation in FIG. 9.

In this way, the right rear protrusion 21RR corresponding to one side of the seat surface 103 (weighted side) and the left rear protrusion 21RL corresponding to the other side of the seat surface 103 (unweighted side) are sequentially activated, so that the lower back or the buttocks of the passenger P is pushed to the unweighted side by the rear protrusion 21R. By this means, it is possible to correct the sitting state where the weight is unevenly applied to the seat surface cushion 103 to the sitting state illustrated in FIGS. 3A-3B where the weight is evenly applied to the seat surface 103 on the right and left sides with respect to the approximate center of the seat cushion 101 in the seat width direction. That is, it is possible to correct the sitting state of the passenger P by activating the activation member 2 along the seat width direction.

Here, it is preferred that the left rear protrusion 21RL which is first activated to deform and protrude the seat surface 103 upward keeps activated to continue to protrude the seat surface 103 at least until the right rear protrusion 21RR is completely activated. By this means, the right rear protrusion 21RR and the left rear protrusion 21RL work together to prevent the lower body of the passenger P from sinking and moving forward. Therefore, it is possible to correct the sitting state of the passenger P and also to maintain the corrected and appropriate state.

With the above-described examples, when the passenger protection apparatus detects or predicts a collision, the activation member 2 is activated upward in the seat cushion 101 at the activation point suitable for the sitting state of the passenger P. Therefore, it is possible to restrict the movement of the lower back or the buttocks of the passenger P, and to support various sitting states by performing the control based on the sitting state. Consequently, it is possible to prevent the lower body of the passenger from moving forward in a collision even though the passenger P sits in any postures. As a result, it is possible to provide a passenger protection apparatus capable of placing the passenger P in an appropriate sitting state that allows the airbags to absorb the impact of the collision and allows the belt to hold the passenger P.

With the above-described examples illustrated in FIGS. 1A to 10, the activation member includes protrusions each including an airbag body which deploys upward. However, this is by no means limiting, and the activation member may be a structure made of a forming resin body moved upward by an actuator to push the seat surface from below, so that the seat surface is deformed and protruded.

Although the example of the present invention has been described, it will be appreciated that the present invention is not limited to the descriptions and drawings of the example. Other examples practiced by persons skilled in the art based on the example, and techniques to use the example are covered by the scope of the present invention.

The invention claimed is:

1. A passenger protection apparatus comprising:
   a seat with a seat cushion;
   an activation member configured to be activated upward in the seat cushion at an activation point configured to change in a front-rear direction of the vehicle;
   a first detector configured to detect or predict a collision of the vehicle;
   a second detector configured to detect a sitting state of a passenger sitting on the seat cushion; and
   a controller configured to, when the first detector detects or predicts a collision of the vehicle, determine the activation point in the front-rear direction of the vehicle by using the sitting state of the passenger, and activates the activation member upward in the seat cushion at the determined activation point.

2. The passenger protection apparatus according to claim 1, wherein the controller sets the activation point under or in front of a seat region subject to greatest passenger compression.

3. The passenger protection apparatus according to claim 1, wherein the sitting state includes at least one of a sitting position of the passenger on the seat cushion and a sitting posture of the passenger.

4. The passenger protection apparatus according to claim 1, wherein:
   the activation member comprises a protrusion configured to be activated upward to push a seat surface so that the seat surface is deformed and protruded upward; and
   the activation member can change the activation point to change a deformation position at which the seat surface is deformed by the protrusion.

5. The passenger protection apparatus according to claim 4, wherein:
   the protrusion comprises one of an airbag capable of deploying upward under the seat surface and a movable structure configured to move upward under the seat surface by an actuator;
   the activation member comprises a movement member configured to move the protrusion; and
   the controller causes the movement member to move the protrusion to the set activation point, and deploys the airbag or moves the movable structure upward, so that the seat surface is deformed and protruded.

6. The passenger protection apparatus according to claim 4, wherein:
   the protrusion comprises a plurality of protrusions, each of the protrusions comprising an airbag capable of deploying upward under the seat surface,
   the protrusions are arranged in the seat cushion in parallel in a front-rear direction of the vehicle, and
   the controller deploys the airbag located in a set deformation position.

7. The passenger protection apparatus according to claim 4, wherein:
   the protrusion comprises a plurality of protrusions arranged in a seat width direction; and
   when the sitting state leans to one side of the seat cushion in the seat width direction, the controller causes the activation member to deform the seat surface at the set activation point from the one side to the other side of the seat cushion in the seat width direction.

8. The passenger protection apparatus according to claim 1, wherein the first detector is configured to detect for a frontal collision of the vehicle, and upon detection of a frontal collision by the first detector, the controller initiates the activation member into a position configured to prevent forward passenger sliding along the seat cushion.

9. A passenger protection apparatus comprising:
   a seat with a seat cushion on which a passenger can sit;
   an activation member configured to be activated upward in the seat cushion;
   a first detector configured to detect or predict a collision of a vehicle;
   a second detector configured to detect a sitting state of the passenger sitting on the seat cushion; and
   a controller configured to control activation of the activation member, wherein:
      the activation member can change an activation point at which the activation member is activated upward;
      when the first detector detects or predicts a collision of the vehicle, the controller sets the activation point on a basis of the sitting position detected by the second detector, and activates the activation member upward in the seat cushion at the determined activation point, and wherein:
   the activation member comprises a protrusion configured to be activated upward to push a seat surface so that the seat surface is deformed and protruded upward; and
   the activation member can change the activation point to change a deformation position at which the seat surface is deformed by the protrusion, and wherein:
   the protrusion comprises a plurality of protrusions, each of the protrusions comprising an airbag capable of deploying upward under the seat surface,
   the protrusions are arranged in the seat cushion in parallel in a front-rear direction of the vehicle, and
   the controller deploys the airbag located in a set deformation position.

10. A passenger protection apparatus comprising:
    a seat with a seat cushion on which a passenger can sit;
    an activation member configured to be activated upward in the seat cushion;
    a first detector configured to detect or predict a collision of a vehicle;
    a second detector configured to detect a sitting state of the passenger sitting on the seat cushion; and
    a controller configured to control activation of the activation member, wherein:
       the activation member can change an activation point at which the activation member is activated upward;

when the first detector detects or predicts a collision of the vehicle, the controller sets the activation point on a basis of the sitting position detected by the second detector, and activates the activation member upward in the seat cushion at the determined activation point, wherein:

the activation member comprises a protrusion configured to be activated upward to push a seat surface so that the seat surface is deformed and protruded upward; and the activation member can change the activation point to change a deformation position at which the seat surface is deformed by the protrusion wherein:

the protrusion comprises a plurality of protrusions arranged in a seat width direction; and when the sitting state leans to one side of the seat cushion in the seat width direction, the controller causes the activation member to deform the seat surface at the set activation point from the one side to the other side of the seat cushion in the seat width direction.

* * * * *